United States Patent
Amsinck et al.

(10) Patent No.: US 9,390,464 B2
(45) Date of Patent: Jul. 12, 2016

(54) STENCIL BUFFER DATA COMPRESSION

(71) Applicant: NVIDIA CORPORATION, Santa Clara, CA (US)

(72) Inventors: Christian Amsinck, Cary, NC (US); Bengt-olaf Schneider, Yorktown Heights, NY (US); Jeffrey A. Bolz, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 205 days.

(21) Appl. No.: 14/097,124

(22) Filed: Dec. 4, 2013

(65) Prior Publication Data

US 2015/0154733 A1    Jun. 4, 2015

(51) Int. Cl.
| | |
|---|---|
| *G06T 9/00* | (2006.01) |
| *G06T 15/40* | (2011.01) |
| *G06T 1/60* | (2006.01) |
| *H04N 19/593* | (2014.01) |
| *H04N 19/436* | (2014.01) |
| *G06T 15/00* | (2011.01) |

(52) U.S. Cl.
CPC .............. *G06T 1/60* (2013.01); *G06T 15/005* (2013.01); *H04N 19/436* (2014.11); *H04N 19/593* (2014.11)

(58) Field of Classification Search
None
See application file for complete search history.

(56) References Cited

U.S. PATENT DOCUMENTS

| 7,248,261 B1* | 7/2007 | Hakura | G06T 15/60 345/426 |
|---|---|---|---|
| 2006/0033743 A1* | 2/2006 | Morein | G06T 15/005 345/501 |
| 2006/0038822 A1* | 2/2006 | Xu | G06T 15/60 345/555 |
| 2008/0225049 A1* | 9/2008 | Fowler | G06T 15/40 345/422 |
| 2008/0273029 A1* | 11/2008 | Brennan | G06T 15/405 345/420 |
| 2015/0015595 A1* | 1/2015 | Lum | G06T 1/60 345/561 |

\* cited by examiner

*Primary Examiner* — Jacinta M Crawford
(74) *Attorney, Agent, or Firm* — Artegis Law Group, LLP

(57) ABSTRACT

A raster operations (ROP) unit is configured to compress stencil values included in a stencil buffer. The ROP unit divides the stencil values into groups, subdivides each group into two halves, and selects an anchor value for each half. If the difference between each of the stencil values and the corresponding anchor lies within an offset range, and the difference between the two anchors lies within a delta range, then the group is compressible. For a compressible group, the ROP unit encodes the anchor value, offsets from anchors, and an anchor delta. This encoding enables the ROP unit to operate on the compressed group instead of the uncompressed stencil values, reducing the number of memory and computational operations associated with the stencil values. Consequently, the ROP unit reduces memory bandwidth use, reduces power consumption, and increases rendering rate compared to conventional ROP units that implement less flexible compression techniques.

20 Claims, 9 Drawing Sheets

STENCIL BUFFER DATA COMPRESSION

BACKGROUND OF THE INVENTION

1. Field of the Invention

Embodiments of the present invention relate generally to graphics processing and, more specifically, to stencil buffer data compression.

2. Description of the Related Art

Some conventional graphics processing units (GPUs) include different processing engines configured to operate in parallel with one another to implement a graphics processing pipeline. A graphics processing pipeline is the collection of processing steps performed to transform 3-D scene descriptions into rendered 2-D images. When a given processing engine finishes processing data, that processing engine may copy the processed data from local memory to a memory that is shared between the different processing engines within the GPU. Other processing engines may then access the processed data and then perform additional processing operations with that data. One type of data structure used in a graphics processing pipeline to allow different processing engines to access that data is a stencil buffer.

Stencil buffers include stencil values associated with each pixel or sample included in an image surface. Typically, each stencil value is an unsigned integer represented by 8 bits. The meaning and use of the stencil values varies by application. But, in general, stencil values are compared with reference values as part of stencil tests. The outcome of a particular stencil test is often coupled with a depth test and the result determines whether a sample is discarded. In operation, an advanced GPU typically performs many memory access operations and computation operations on the stencil values. Performing this quantity of operations negatively impacts the memory bandwidth, power consumption, and processing speed of the GPU. Because memory bandwidth, acceptable power consumption, and processing capability of GPUs are limited, any increase in memory bandwidth, power consumption, or number of processing operations is generally undesirable.

To reduce the number of operations performed on the stencil values, some advanced GPUs implement a one-bit delta stencil buffer compression algorithm. In particular, the stencil buffer compression algorithm enables the GPU to perform memory operations and computation operations on "compressible" groups of stencil values without individually accessing each value in the stencil group. Such a technique reduces the number of memory access operations and computation operations associated with compressible stencil groups. Each stencil group represents the stencil values of groups of proximally-located samples. In general, to determine whether to compress the stencil group, the GPU evaluates the stencil values included in the stencil group. If the stencil values in the stencil group vary by only one (i.e., stencil values 64 and 63, stencil values 98 and 99, etc.), then the GPU compresses the stencil group. However, if the stencil values of the samples in the group vary by more than one (i.e., stencil values of 64 and 62, stencil values of 98, 99, and 100, etc.), then the GPU does not compress the stencil group.

One limitation of the one-bit delta stencil buffer compression technique is that the number of compressible sample groups may be limited. For example, many graphics GPUs support rendering paths through a two-pass rendering process known as "stencil-then-cover." First, in a path stenciling pass, the GPU generates a stencil buffer that indicates which samples (i.e., positions within each pixel) are covered by the path. Second, in a path covering pass, the GPU generates cover geometry for the path and shades the cover geometry with stencil testing enabled. As part of the path stenciling pass, many GPUs implement a winding algorithm in which the stencil value for a particular sample is based on the triangles included in the path that cover the sample. The triangles that have a counterclockwise winding are referred as "front-facing" triangles, whereas the triangles that have a clockwise winding are referred to as "back-facing" triangles. For each front-facing triangle included in a path, the GPU increments the stencil value corresponding to each covered sample. By contrast, for each back-facing triangle included in a path, the GPU decrements the stencil value corresponding to each covered sample.

Many complex paths include concave geometry with multiple front-facing and back-facing triangles, and the corresponding stencil values in a localized region will often vary by more than one. For example, suppose that two samples were to be represented in a particular stencil group. Further, suppose that one sample were to be covered by one front-facing triangle and three back-facing triangles and the other sample were to be covered by two front-facing triangles and two back-facing triangles. In such a case, the delta between the two corresponding stencil values would be 2. Since the one-bit delta stencil compression technique for stencil buffer compression does not support a delta of more than 1 across a stencil group, a GPU implementing such a technique would not compress the stencil group. Consequently, the GPU that implemented the one-bit delta stencil compression technique would not provide any memory bandwidth, power, or performance advantage for the group compared to a GPU that did not implement any stencil buffer compression.

As the foregoing illustrates, what is needed in the art is a more effective approach to stencil buffer compression.

SUMMARY OF THE INVENTION

One embodiment of the present invention sets forth a method for compressing stencil values. The method includes selecting a first anchor for a first batch of stencil values that includes a first stencil value; selecting a second anchor for a second batch of stencil values that includes a second stencil value; computing a first offset that is included in a first plurality of offsets based on the first stencil value and the first anchor, where the first plurality is associated with the first batch; computing a second offset that is included in a second plurality of offsets based on the second stencil value and the second anchor, where the second plurality is associated with the second batch; computing an anchor delta based on the first anchor and the second anchor; and storing the first anchor, the anchor delta, the first plurality of offsets, and the second plurality of offsets in a memory as a first compressed stencil data instead of storing the first batch and the second batch in the memory as uncompressed stencil data.

One advantage of the disclosed approach is that a processing unit may compress stencil values across groups of samples where the stencil values vary by more than one. Consequently, the processing unit performs more stencil operations on compressed stencil data compared to conventional processing units that implement one-bit delta compression techniques. Operating on compressed stencil data improves the efficiency of the processing unit compared to operating on uncompressed stencil data. Accordingly, the processing unit reduces memory bandwidth, reduces power consumption, and increases rendering frame rate compared to conventional processing units that implement more restrictive compression techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
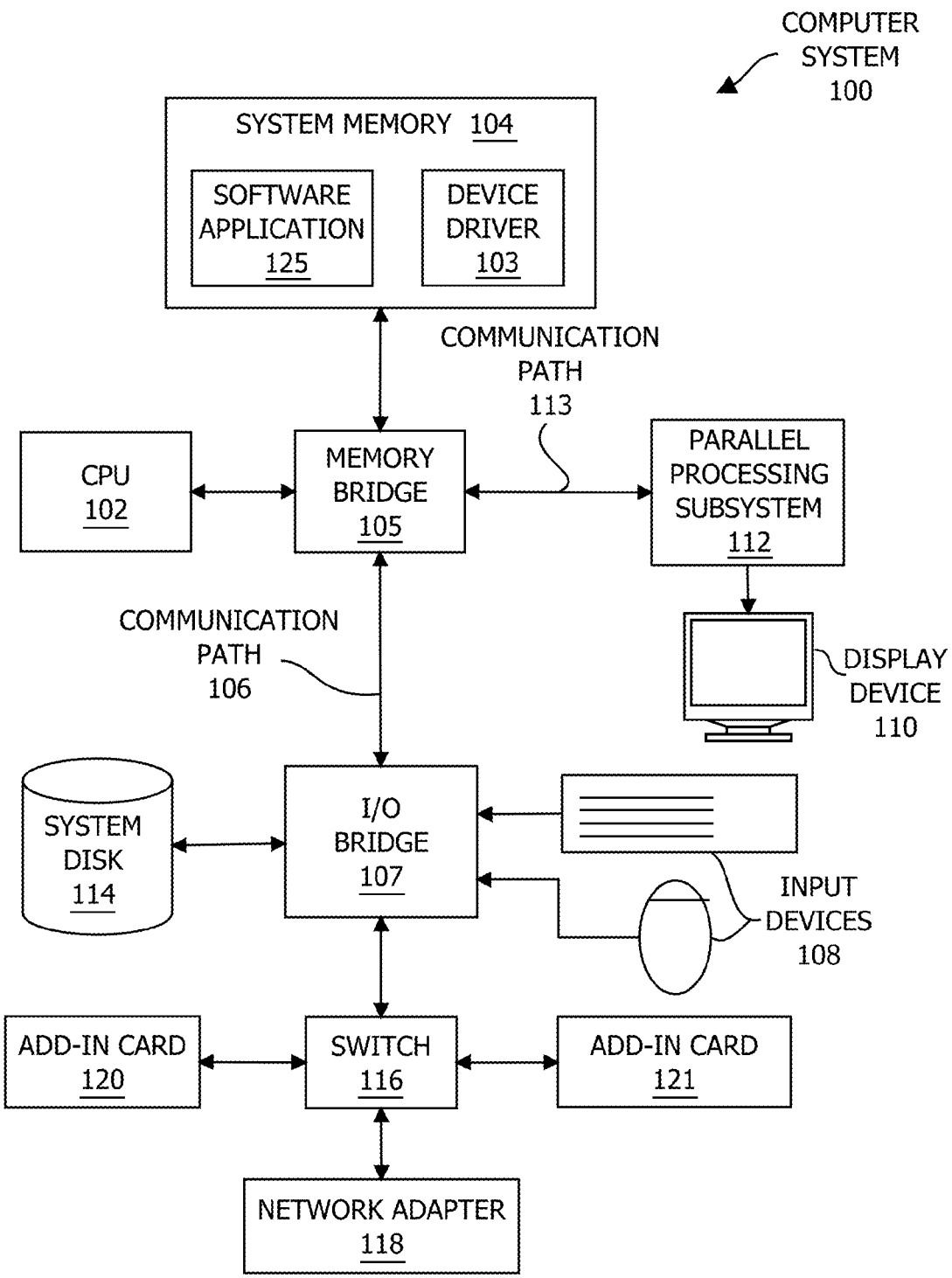
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
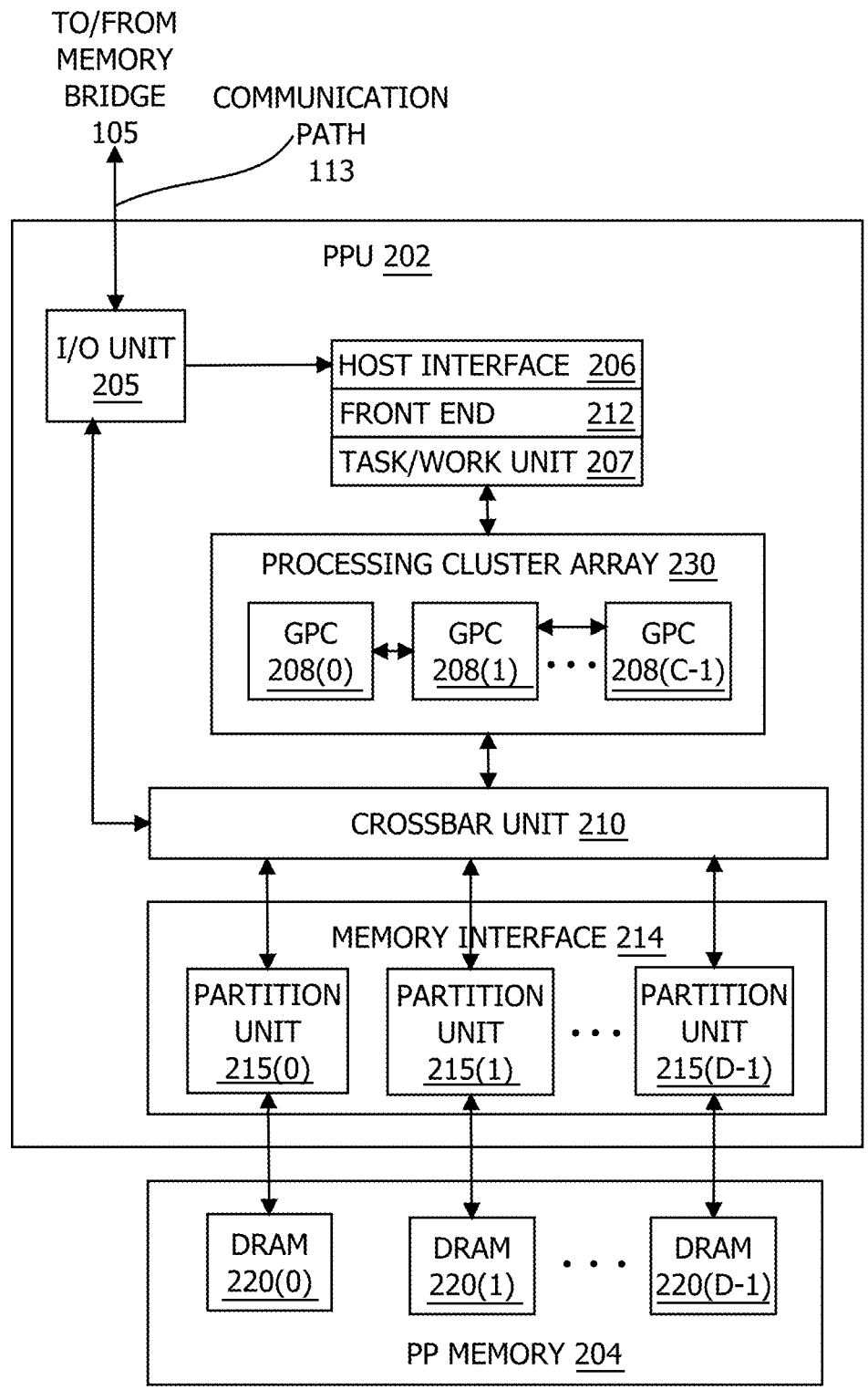
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Graphics Pipeline Architecture

Figure 3:
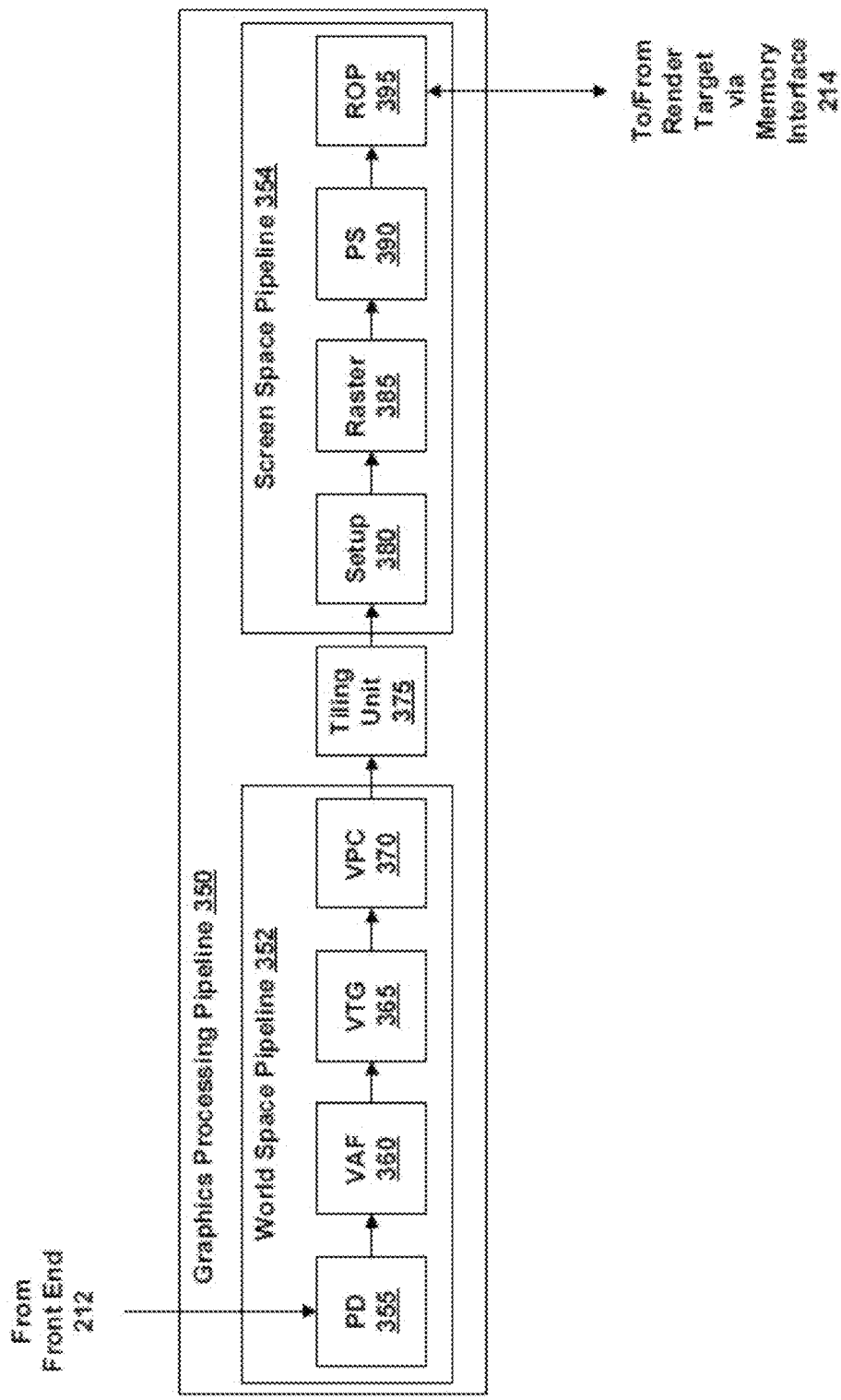
FIG. 3 is a conceptual diagram of a graphics processing pipeline that may be implemented within the parallel processing unit of FIG. 2, according to one embodiment of the present invention.

FIG. 3 is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory. Please note, as used herein, references to shared memory may include any one or more technically feasible memories, including, without limitation, a local memory shared by one or more streaming multiprocessors, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that are stored in shared memory by the VAF and may process the vertex data and vertex attributes. The vertex processing unit stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP unit 395. The pixel shading unit 390 may read data that is stored in shared memory.

The ROP unit 395 is a processing unit that performs raster operations, such as stencil test, z test, stencil operations, blending, and the like, and transmits pixel data as processed graphics data for storage in graphics memory via the memory interface 214, where graphics memory is typically structured as one or more render targets. The processed graphics data may be stored in any available memory, such as parallel processing memory 204 or system memory 104, for display on display device 110 or for further processing by CPU 102 or parallel processing subsystem 112.

As part of generating processed graphics data, the ROP unit 395 may perform memory operations on stencil data included in a stencil buffer. The stencil buffer is stored in any available memory, such as the graphic memory, parallel processing memory 204, system memory 104, or a cache memory (e.g., L2 cache). Advantageously, the ROP unit 395 is configured to opportunistically compress stencil data included in the stencil buffer and operate on such compressed stencil data. Further, the ROP unit 395 is configured to uncompress stencil data to perform operations that do not support compressed stencil data or to store stencil data that is not amenable to compression. In some embodiments, the ROP unit 395 is also configured to compress z or color data that is written to memory and decompress z or color data that is read from memory. In various embodiments, the ROP unit 395 may be located in the memory interface 214, in the GPCs 208, in the processing cluster array 230 outside of the GPCs, or in a separate unit (not shown) within the PPUs 202.

The graphics processing pipeline 350 may be implemented by any one or more processing elements within PPU 202. For example, a streaming multiprocessor (not shown) within one of the GPCs 208 of FIG. 2 could be configured to perform the functions of one or more of the VTG 365 and the pixel shading unit 390. The functions of the PD 355, the VAF 360, the VPC 450, the tiling unit 375, the setup unit 380, the rasterizer 385, and the ROP unit 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP unit 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Stencil Compression

One type of data structure used in the graphics processing pipeline 350 to facilitate rendering images is the stencil buffer. For each sample, the stencil buffer typically includes data that corresponds to a single 8-bit stencil value. In a conventional graphics processing pipeline that does not support stencil compression, each such stencil value is represented as 8 discrete bits. By contrast, in the graphics processing pipeline 350, as implemented in the present invention, the stencil values of neighboring groups of samples may be represented in the stencil buffer as compressed stencil data. This compressed stencil data is encoded in a manner that permits the graphics processing pipeline 350 to perform fewer memory and computation operations on the stencil buffer while generating the same rendered images as conventional graphics processing pipelines 350.

Although the stencil buffer may be used in a variety of different algorithms, the stencil values associated with proximally-located samples are often relatively uniform. For instance, a typical 8-bit stencil value may represent a decimal value from 0 through 255, and in a "batch" of stencil values corresponding to a 4×4 set of neighboring samples, each of the stencil values often lies within a range of three values, such as 122, 123, and 124. As persons skilled in the art will recognize, the 8-bit binary representation inherently wraps-around, so that 255 and 0 represent consecutive values.

Advantageously, the graphics processing pipeline 350 implements a compression technique that exploits this relative uniformity of stencil values. If the ROP unit 395 determines that the stencil values in a batch lie within a predetermined, per-batch stencil value range of three values, then the batch is a candidate for compression. Notably, the per-batch offset range is selected to optimize the architecture of the PPU 202, the memory bandwidth, and the storage of the stencil buffer. In alternate embodiments, the number of stencil values in included in a batch and the per-batch offset range may vary. For instance, in some alternate embodiments non-contiguous stencil value sets, such as 0, 1, and 128 may be compressed. In general, if the pattern in which three numbers are represented by each offset value (0, 1, and 2) is fixed, then the compressible stencil values are arbitrary.

In operation, if a batch is compressible, a "group" of 8×4 stencil values that include the batch is compressible, and the group's three neighboring groups forming a 16×8 block of stencil values are all compressible, then the ROP unit 395 compresses the stencil values in the 16×8 block. Each compressible batch is associated with an anchor value, and each stencil value 409 included in the batch has a value equal to the value computed with an offset value of 0, 1, or 2 from this anchor value. A group of stencil values is compressible when both a left batch and a right batch included in the group are compressible, and the result of subtracting the anchor value of the right batch from the anchor value of the left batch is one of (−3), (−2), (−1), 0, 1, or 2. The range (−3) through 2 is the per-group delta range, and is selected to optimize the architecture of the PPU 202, the memory bandwidth, and the storage of the stencil buffer. In alternate embodiments, the per-group delta range may vary to optimize the compression algorithms in any technically feasible fashion. Finally, when all four of the groups included in the 16×8 block are compressible, the ROP unit 395 stores the compressed encoding in a 32B subpacket. A "subpacket" is defined to be 32 bytes, and is a common size of a transaction to or from a memory or a cache. In alternate embodiments, the number of groups in each subpacket or the size or shape of the subpacket may vary. Also, in alternate embodiments, the shape, and size of batches and groups may vary, and additional levels of hierarchy are conceivable as well, as are alternate mappings of encoded anchor/batch deltas to specific functions of the anchor/per-group delta range.

Advantageously, for a compressible 16×8 group, the ROP unit 395 stores the stencil data in a compressed form instead of as individual 8-bit stencil values. More specifically, for each group, the ROP unit 395 stores the left anchor value, the offsets of the stencil values in the left batch relative to the left anchor value, the offsets of the stencil values in the right batch relative to the right anchor value, and the delta between the left anchor value and the right anchor value. To further optimize memory usage, as described in detail in conjunction with FIG. 5, the ROP unit 395 encodes the deltas and a portion of the anchor into triplets. And to enable the units within the graphics processing pipeline 350 to easily operate on either compressed or uncompressed stencil values, the ROP unit 395 stores the compressed stencil data in the pre-allocated stencil buffer. More specifically, the ROP unit 395 stores four groups in the subpacket that would otherwise store the uncompressed stencil values for one group. In alternate embodiments, the ROP unit 395 may perform memory operations that store the compressed stencil data included in the stencil buffer in any available memory in any technically feasible fashion.

In addition to performing compression and decompression operations, the ROP unit 395 performs computational operations, such as stencil tests and stencil operations (e.g. increment, decrement, and replace operations) on compressed stencil data without performing any unnecessary decompression operations. By operating on compressed stencil data instead of uncompressed stencil values, the number of both memory and computational operations associated with the stencil buffer is decreased. Consequently, the bandwidth use and processing resources required to process the stencil buffer is reduced compared to conventional graphics processing pipelines 350. In particular, the ROP unit 395 may compress more stencil values than a graphics processing pipeline that implements a one-bit delta stencil compression algorithm that does not compress groups of stencil values that vary by more than one.

In alternate embodiments, the ROP unit 395 may perform any number or type of computational operations on compressed stencil data—decompressing the compressed stencil data only as required by the variation in the stencil values. In yet other embodiments, any number and type of units included in the graphics processing pipeline 350 may be configured to perform read, write, or computational operations on compressed stencil data. For instance, in some embodiments the stencil buffer may be stored in the L2 cache, and the L2 cache may be configured to perform decompression operations for "naïve" clients, such as a texture unit, that are not configured to correctly interpret compressed stencil data. In yet other embodiments, additional units in the graphics processing pipeline 350, such as the rasterizer 385, may include functionality designed to optimize the identification and processing of stencil data that is amenable to compression. In addition, units included in the PPU 202, such as the front end unit 212, may include functionality to control and/or optimize stencil compression.

Figure 4A:
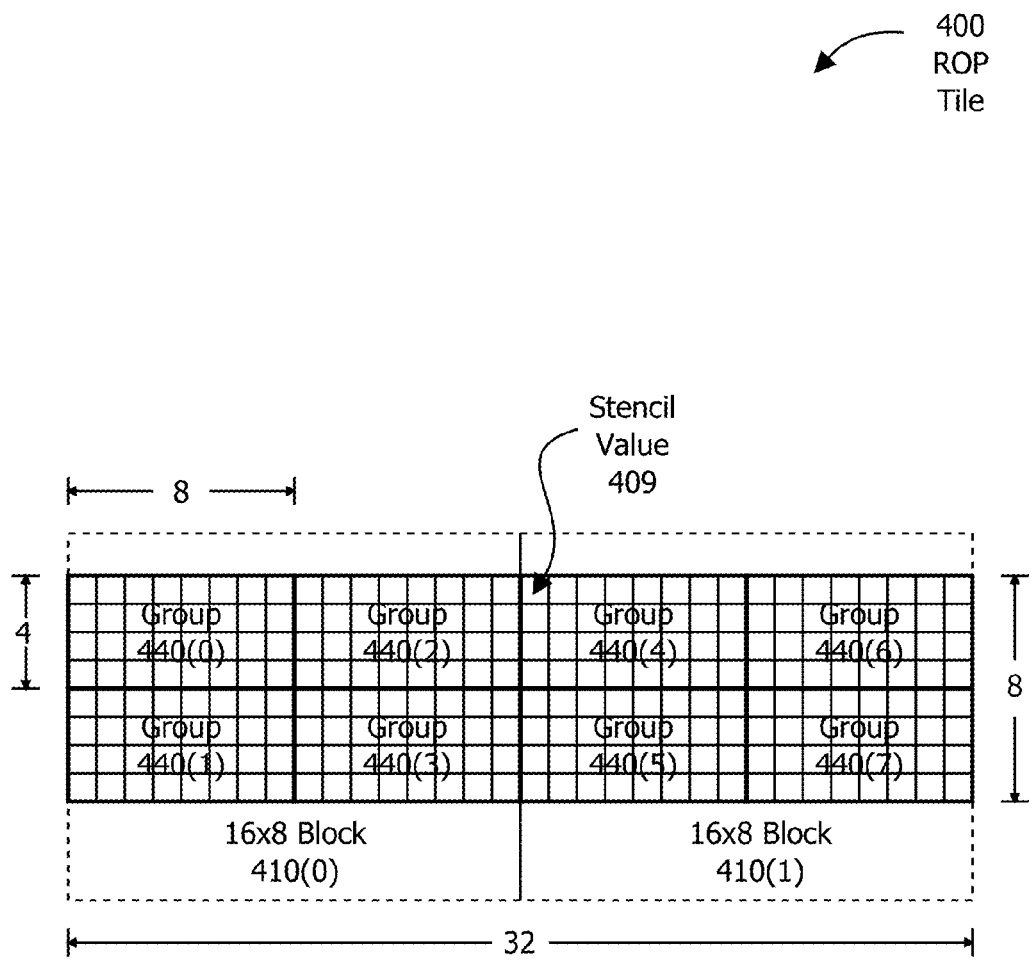
FIGS. 4A-4C are conceptual diagrams of a ROP tile, an uncompressed subpacket, and a compressed subpacket, according to one embodiment of the present invention.
Figure 4B:
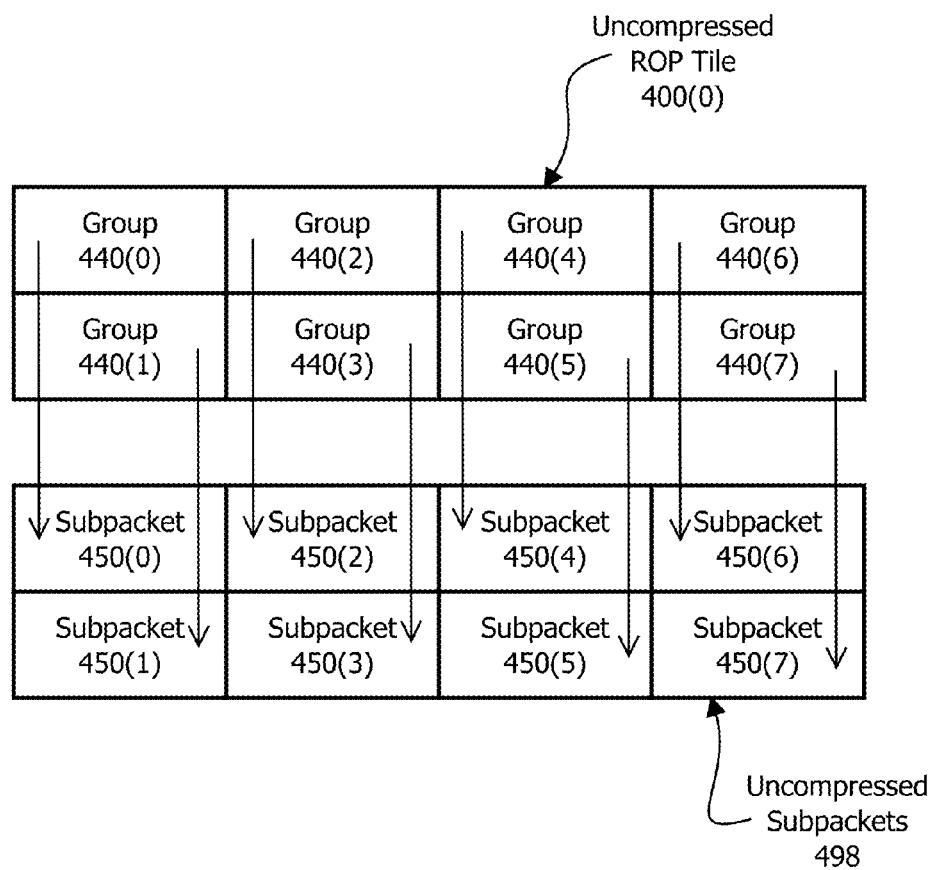
Figure 4C:
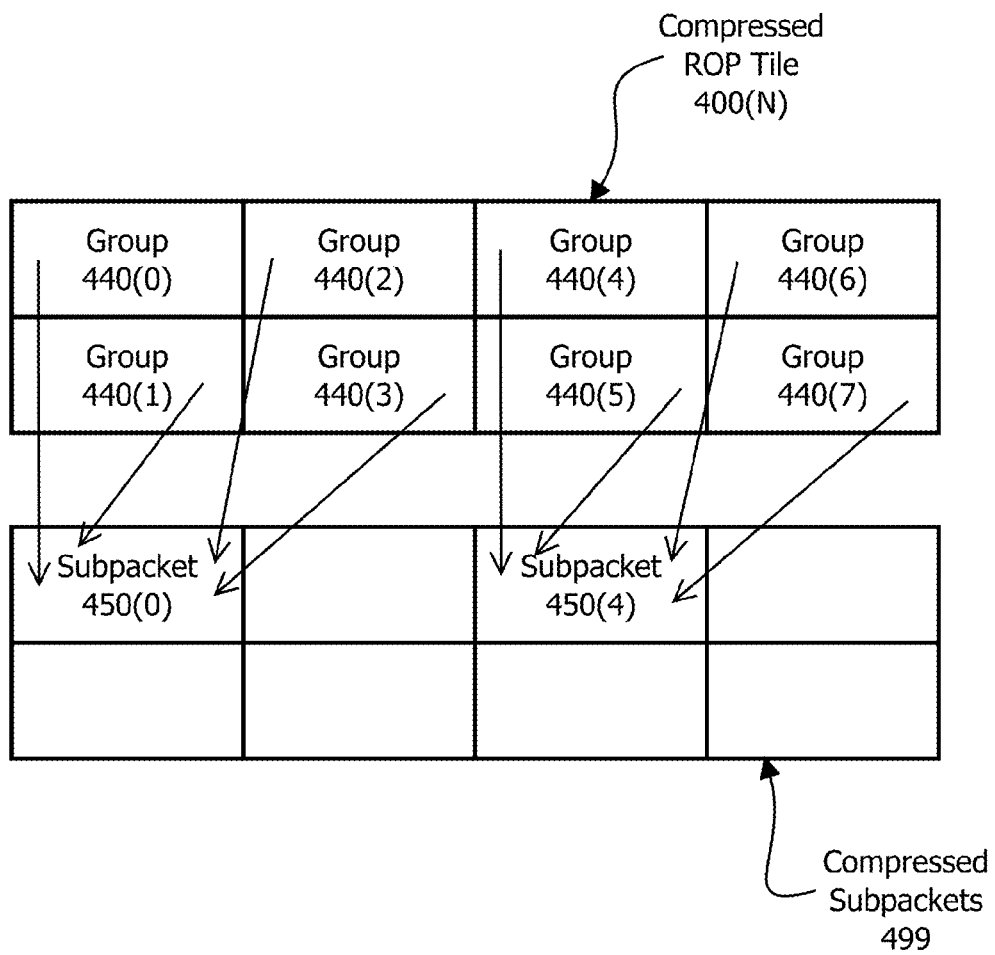

FIGS. 4A-4C are conceptual diagrams of a ROP tile 400, an uncompressed subpacket 498, and a compressed subpacket 499, according to one embodiment of the present invention. In operation, the ROP unit 395 processes sets of neighboring samples, and the ROP tile 400 corresponds to a portion of the stencil buffer that represents the 256 stencil values 409 associated with a set of 256 neighboring stencil samples.

As shown in FIG. 4A, the 256 stencil values 409 in the ROP tile 400 are arranged in eight rows of thirty-two stencil values 409. As also shown in FIG. 4A, each ROP tile 400 is partitioned into two 16×8 blocks 410 of stencil values 409. Each 16×8 block 410 is further subdivided into four rectilinear 8×4 groups 440 of stencil values 409.

As shown in FIG. 4B, each ROP tile 400 corresponds to eight subpackets 450. Each subpacket 450 may store one group 440 of uncompressed stencil values 409, depicted in FIG. 4B as the uncompressed subpacket 498. Alternatively, as shown in FIG. 4C, with stencil compression, 4 groups 440 can be stored in the single compressed subpacket 499. If both the 16×8 blocks 410 are compressed, then they are stored in two compressed subpackets 499—the compressed subpacket 499(0) that includes the leftmost 16×8 block 410(0) of compressed stencil values 409, and the subpacket 499(4) that includes the rightmost 16×8 block 410(1) of compressed stencil values 409.

Advantageously, the ROP unit 395 opportunistically encodes the stencil values 409 as compressed stencil data. A set of 4 groups 440 is the basic unit of stencil compression. If each of the four groups 440 included in a particular 16×8 block 410 is compressible, then they are stored compressed in a compressed subpacket 499. By contrast, if one or more of these four groups 440 is not compressible, then each of the groups 440 is stored in a single uncompressed subpacket 498. As previously outlined, the ROP unit 395 determines whether a particular group 440 is compressible based on the variation of the stencil values 409 within the particular group 440.

If the ROP unit 395 determines that a particular set of groups 440 is compressible, then the ROP unit 395 encodes the stencil values 409 representing these samples into compressed stencil data. Subsequently, the ROP unit performs write operations that store the compressed stencil data associated with the four groups 440 into the memory allocated to a single uncompressed group 440 as the compressed subpacket 499. For instance, if the set of groups 440(0)-440(3) are compressible, then the ROP unit 395 performs write operations that store the compressed stencil data associated with the four groups 440(0)-440(3) as the compressed subpacket 499(0) in the memory allocated to the uncompressed subpacket 498(0). Advantageously, units within the graphics processing pipeline 350, including the ROP unit 395, are configured to operate directly on compressed stencil data. The ROP unit 395 may indicate the compression status of each subpacket 450 in any technically feasible fashion, such as by activating a compression flag.

On the other hand, if a particular set of groups 440 is not compressible, then the ROP unit 395 stores the stencil values 409 individually, and units within the graphics processing pipeline 350 operate on the uncompressed stencil values 409. For instance, if the any of the groups 440(0-3) are not compressible, then the ROP unit 395 performs write operations that store the stencil values 409 associated with the groups 440(0-3) in the uncompressed subpackets 498(0-3) respectively.

The division of samples and the associated stencil values 409 as well as the dimensions of each group 440 of stencil values 409 are optimized to reflect the architecture of the PPU 202, including the capability of any associated memory units, such as the PP memory 204. Consequently, in alternate embodiments, the sizes of the groups 440 of stencil values 409 may be smaller or larger, the number of hierarchical levels into which the stencil values 409 (e.g., the 16×8 blocks 410) are divided may vary, and the processing of the stencil values 409 may differ without departing from the broader scope of the disclosed techniques. Further, the ROP unit 395 may store the compressed stencil data in any subset of the memory typically required to store the corresponding uncompressed stencil values 409.

Figure 5:
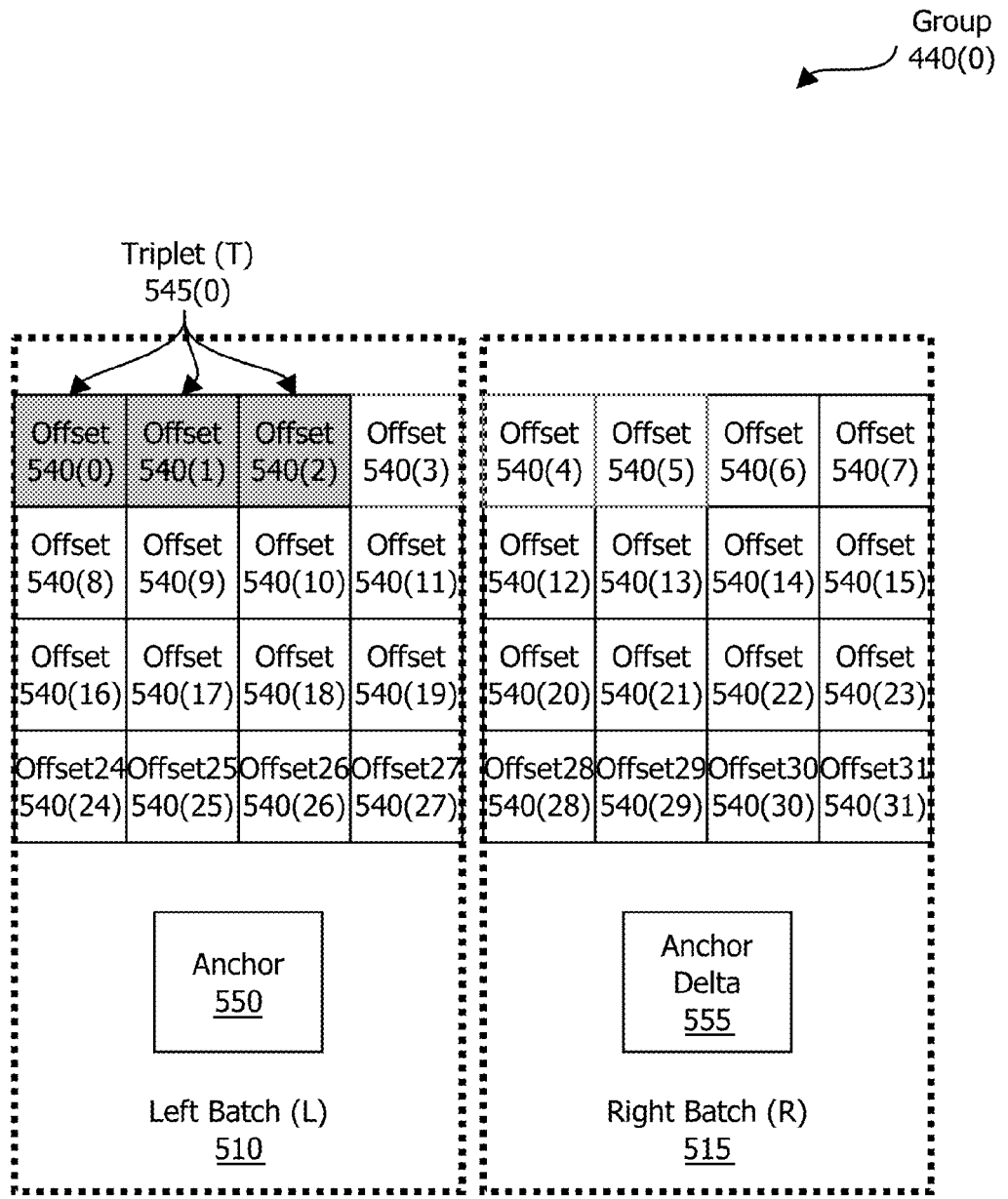
FIG. 5 is a conceptual diagram of the stencil data associated with one of the compressible groups of FIG. 4, according to one embodiment of the present invention.

FIG. 5 is a conceptual diagram of the stencil data associated with one of the compressible groups 440 of FIG. 4, according to one embodiment of the present invention. As shown, the group 440(0) is divided into two equal halves—a left batch (L) 510 and a right batch (R) 515. The left batch 510 includes stencil data corresponding to the sixteen stencil values included the left half of the group 440(0). Similarly, the right batch 515 includes stencil data corresponding to the sixteen stencil values 409 included in the right half of the group 440(0).

The left batch 510 is associated with an anchor value 550 and sixteen offsets 540. The anchor value 550 is a base stencil value 409 for the left batch 510, and each of the offsets 540 included in the left batch 510 represents a sample-specific offset relative to the anchor value 550. In general, the stencil value 409 associated with the sample at a particular location in the left batch 510 is the sum of the anchor value 550 and the offset 540 at the particular location in the left batch 510. For instance, the stencil value 409 associated with the sample at the location '0' is the sum of the anchor value 550 and the offset 540(0). In alternate embodiments, other functions of anchor value 550 and offset 540 are possible.

As also shown, the right batch 515 is associated with an anchor delta 555 and sixteen offsets 540. The right batch 515 is further associated with a right anchor value (not shown) that is the base stencil value 409 for the right batch 515. The anchor delta 555 is the result of subtracting the value of the (left) anchor 550 from the right anchor value. As described in conjunction with FIG. 3, for the group 440(0) to be compressible the value of the anchor delta 555 must lie within the per-group delta range (−3) through 2. Advantageously, indirectly encoding the base stencil value 409 for the right batch 515 as the anchor delta 555 facilitates encoding the relevant data in fewer bits than would be required to store the base stencil value 409 directly.

Each of the offsets 540 included in the right batch 510 represents a sample-specific offset relative to the right anchor value. Accordingly, the stencil value 409 associated with the sample at a particular location in the right batch 515 is a function (e.g. the sum) of the anchor value 550, the anchor delta 555, and the offset 540 at the particular location in the right batch 515. For instance, the stencil value 409 associated with the sample at the location '4' is the sum of the anchor value 550, the anchor delta 555, and the offset 540(4).

In one embodiment, the ROP unit 395 sets the anchor 550 to the lowest stencil value 409 represented in the left batch 510 of the group 440(0) and the right anchor to the lowest stencil value 409 represented in the right batch 515 of the group 440(0). In alternate embodiments, the ROP unit 395 may select the anchor 550 and the right anchor in any technically feasible fashion that enables compression of the group 440(0). For instance, suppose that all the stencil values 409 represented by the left batch 510 were to be '0,' and all the stencil values 409 represented by the right batch 515 were to be '4.' In one alternative embodiment, the ROP unit 395 would set the anchor 550 to '0,' the anchor delta 555 to '2,' and the offsets 540 associated with the right batch 510 to '2.' Such an embodiment may "soften" the constraints imposed by the per-group delta range. By contrast, in such a scenario, if the ROP unit 395 were to set the anchor 550 based on the minimum values, then the value of the anchor 550 would be 0 and the value the anchor delta 555 would be 4, rendering the group 440(N) uncompressible.

As previously disclosed herein, the value of each offset 540 included in a compressible group 440 is one of 0, 1, or 2. To optimize the number of bits used to store the compressed stencil data, sets of offsets 540 across the group 440(0) are organized as triplets (T) 545. Each triplet 545 is allocated 5 bits in the stencil buffer and, therefore, is capable of representing three offsets 450. As shown, the triplet 545(0) represents the offset 540(0), the offset 540(1) and the offset 540(2). Certain triplets 545 may include offsets 540 associated with both the left batch 510 and the right batch 515. For instance, the triplet 545(1) (not shown) represents the offset 540(3) that is associated with the left batch 510, and the offsets 540(4) and 540(5) that are associated with the right batch 515.

Since the total number of offsets 540 included in the group 440(0) is thirty-two, and the maximum number of offsets 540 that each triplet 545 may represent is three, the ROP unit 395 encodes the offsets 540 into eleven triplets 545(0)-545(10). However, the triplet 545(10) only represents the offset 540 (30) and 540(31). As described in detail in conjunction with FIG. 6, to fully utilize the 5 bits allocated to the triplet 545 (10), the ROP unit 395 stores a portion of the anchor delta 555 as part of the triplet 545(10).

Figure 6:
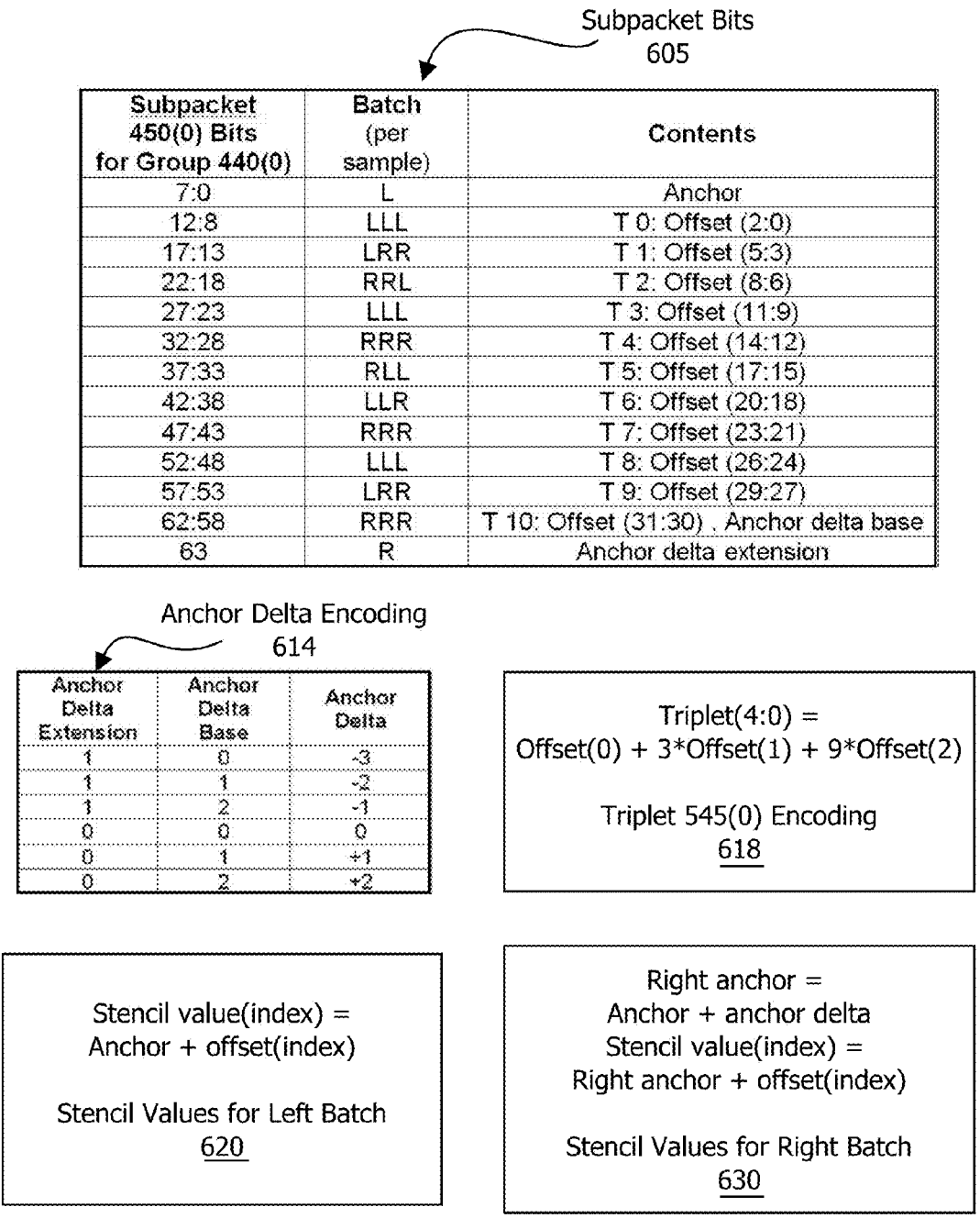
FIG. 6 is a conceptual diagram illustrating subpacket bits corresponding to the compressible group of FIG. 5 and associated encoding and decoding operations, according to one embodiment of the present invention.

FIG. 6 is a conceptual diagram illustrating subpacket bits 605 corresponding to the compressible group 440(0) of FIG. 5 and associated encoding and decoding operations, according to one embodiment of the present invention. For explanatory purposes only, the context of FIG. 6 is that the groups 440(0), 440(1), 440(2), and 440(3) included in the subpacket 450(0) are all compressible. Accordingly, the ROP unit 395 stores the compressed stencil data associated with all the groups 440(0) through 440(3) in the stencil buffer at the location that is reserved for the uncompressed stencil values 409 in the group 440(0)—a total of 256 bits.

As shown, the subpacket bits 605 corresponding to the compressed data included in the group 440(0) include the sixty-four lowest bits included in the subpacket 450(0). Subpacket Bits 605(7:0) store the value of the anchor 550. Each of the triplets 545(0) through 540(9) store the value of three offsets 440. As shown, in a "triplet 545(0) encoding 618," the ROP unit 395 performs an addition operation between the offset 540(0), three times the offset 540(1), and nine times the offset 540(2) to compute the five bits included in the triplet 545(0). In general, to compute the value of triplet 545(N), with N from 0 through 9, the ROP unit 395 sets a sample index to (3*N) and then the ROP unit 395 performs an addition operation between the offset 540(sample index), three times the offset 540(sample index−1), and nine times the offset 540(sample index+2) to compute the five bits included in the triplet 545(N). To compute the triplet 545(10), the ROP unit 395 first performs an "anchor delta encoding" 614.

In the anchor delta encoding 614, the ROP unit 395 splits the value of the anchor delta 555 into an anchor delta extension that represents the sign of the anchor delta 555 and an anchor delta base. If the anchor delta 555 is 0, then the ROP unit 395 sets the anchor delta extension to '0', and the anchor delta base to the value of the anchor delta 555. For example, if the anchor delta 555 is equal to a value of 2, then the ROP unit 395 sets the anchor delta extension to '0' and the anchor delta base to '2.' By contrast, if the anchor delta 555 is <0, then the ROP unit 395 set the anchor delta extension to '1,' and sets the anchor delta base to ((anchor delta 555 & 0x3)−1), where the anchor delta is represented as a 2s-complement number. For instance, if the anchor delta 555 is (−3, i.e. binary 101), then the ROP unit 395 sets the anchor delta extension to '1' and the anchor delta base to '0.' By encoding the anchor delta 555 in this fashion, the ROP unit 395 enables the anchor delta extension to be adequately represented by a single bit, and the anchor delta base to be in the range (0,1,2) which can be represented as a portion of the offset 540(10). In particular, the ROP unit 395 performs an addition operation between the offset 540(30), three times the offset 540(31), and nine times the anchor delta base to compute the four bits included in the triplet 545(10). In essence, the ROP unit 395 treats the anchor delta base as a pseudo-offset that is stored as offset[32] in triplet 545(10).

All of the encoding techniques disclosed herein may be reversed to decode the associated compressed data. For instance, as person skilled in the art will recognize, the triplet 545 and anchor delta encoding operations may be "reversed" to create triplet and anchor delta decoding operations. And, as shown in a "stencil values for left batch" 620 calculation, the stencil values 409 represented by the left batch 510 are calculated by performing addition operations between the anchor 550 and the appropriate offset 540. Similarly, in a "stencil value for right batch" 630 calculation, the stencil values 409 represented by the right batch 515 are calculated by performing addition operations between the anchor 550, the anchor delta 555, and the appropriate offset 540. Advantageously, "compression-aware" units, such as the ROP unit 395, within the graphics processing pipeline 350 may perform operations on the compressed stencil data represented in each compressed subpacket 450 indirectly—without decompressing the subpacket 450. Advantageously, the sizes of the 16×8 block 410 and the subpacket 450 enable units within the PPU 202 to store multiple compressed groups 440 of stencil data in a single memory transaction.

In alternate embodiments, the ROP unit 395 may encode the compressed stencil data in any technically feasible fashion. For instance, the ROP unit 395 may encode the offsets 540 and/or the anchor delta 555 directly instead of encoding values and/or portions of values into the triplets 545. Alternatively, the ROP unit 395 may encode the left anchor as the anchor delta 555 and the right anchor as the anchor 550. As a general matter, the techniques described herein may be varied to optimize different architectures, number of samples, parallel processing models, etc. without departing from the scope of compressing groups of stencil values 409 that exhibit a variance greater than one.

Figure 7:
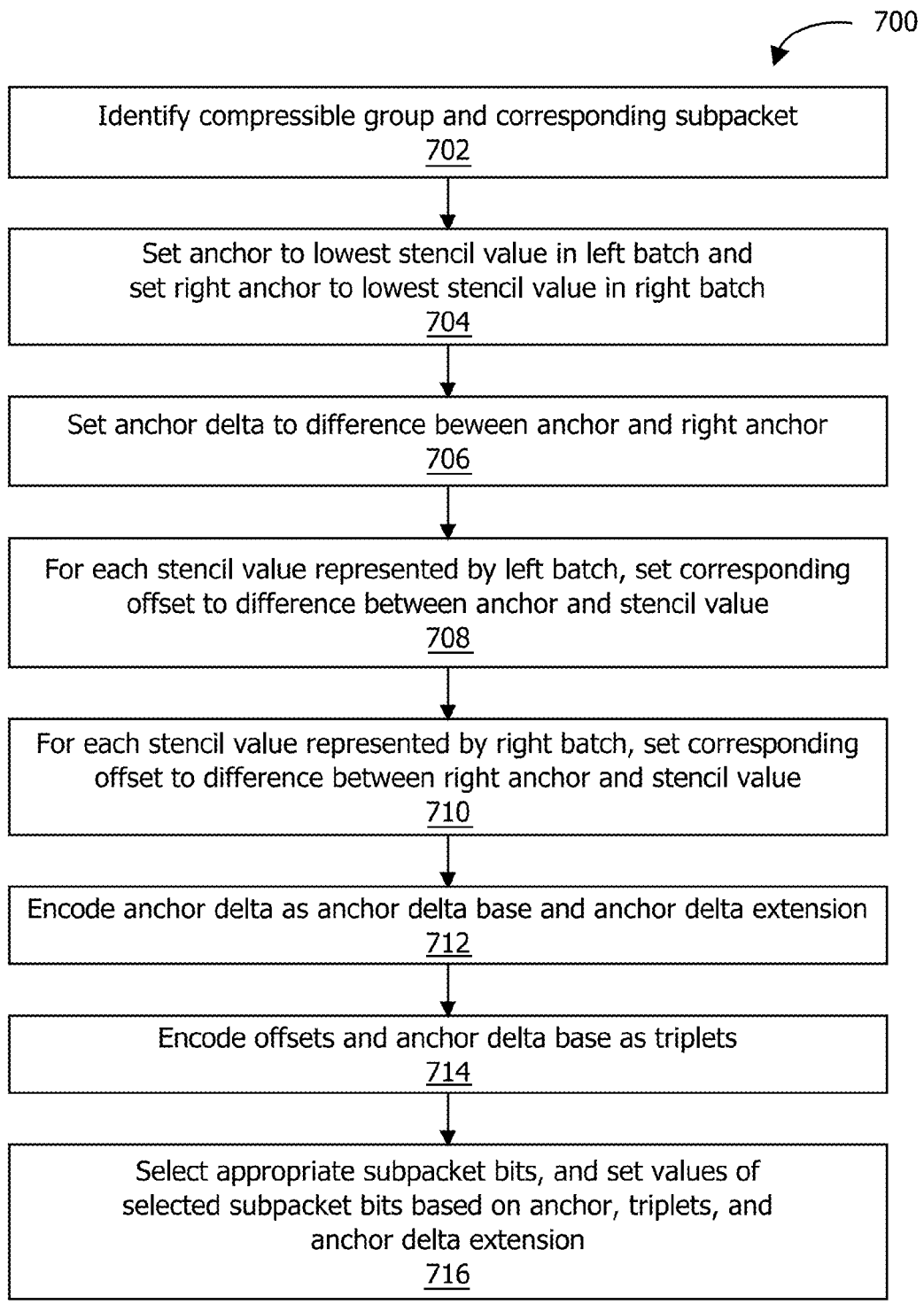
FIG. 7 is a flow diagram of method steps for compressing and storing data in a stencil buffer, according to one embodiment of the present invention.

FIG. 7 is a flow diagram of method steps for compressing and storing data in a stencil buffer, according to one embodiment of the present invention. Although the method steps are described with reference to the systems of FIGS. 1-6, persons skilled in the art will understand that any system configured to implement the method steps, in any order, falls within the scope of the present invention. For illustrative purposes only, FIG. 7 depicts the method steps associated with a group 400 that the ROP unit 395 has previously identified as compressible based on the offsets 540 and the anchor delta 555.

As shown, a method 700 begins at step 702, where the ROP unit 395 identifies a compressible group 440 of stencil values 409 and the compressible subpacket 450 that includes the compressible group 440. The subpacket 450 is, in turn, included in a stencil buffer. As outlined previously herein, the ROP unit 395 determines whether the group 440 is compressible based on the variation of the stencil values 409 across the group 440 and the compressibility of the other three groups 440 included in the subpacket 450. At step 704, the ROP unit 395 sets the anchor 550 to the lowest stencil value 409 represented in the left batch 510 of the group 440 and the right anchor to the lowest stencil value 409 represented in the right batch 515 of the group 440. In alternate embodiments, the ROP unit 395 may select the anchor 550 and the right anchor in any technically feasible fashion that facilitates the compression of the group 440.

At step 706, the ROP unit 395 subtracts the anchor 550 from the right anchor and sets the anchor delta 555 to the resulting difference. Notably, if the group 440 is compressible, then the value of the anchor delta 555 is one of six values: (−3), (−2), (−1), 0, 1, or 2. At step 708, for each stencil value 409 represented in the left batch 510, the ROP unit 395 subtracts the anchor 550 from the stencil value 409 and then sets the corresponding offset 540 to the resulting difference. At step 710, for each stencil value 409 represented in the right batch 515, the ROP unit 395 subtracts the right anchor from the stencil value 409 and then sets the corresponding offset 540 to the resulting difference. As outlined previously herein, if the group 440 is compressible, then each of the offsets 540 is one of three values: 0, 1, or 2. At step 712, the ROP unit 395 encodes the anchor delta 555 as an anchor delta extension and an anchor delta base. If the anchor delta 555 is 0, then the ROP unit 395 sets the anchor delta extension to '0', and the anchor delta base to the absolute value of the anchor delta 555. By contrast, if the anchor delta 555 is <0, then the ROP unit 395 set the anchor delta extension to 1; and sets the anchor delta base to ((anchor delta 555 & 0x3)−1).

At step 714, the ROP unit 395 encodes the offsets 540 and the anchor delta base as five-bit triplets 545. For a triplet(N), with N from 0 through 9, the ROP unit 395 sets a sample index to (3*N) and then the ROP unit 395 performs an addition operation between the offset 540(sample index), three times the offset 540(sample index−1), and nine times the offset 540(sample index+2) to compute the five bits included in the triplet 545(N). And the ROP unit 395 performs an addition operation between the offset 540(30), three times the offset 540(31), and nine times the anchor delta base to compute the five bits included in the triplet 545(10).

At step 716, the ROP unit 395 selects one quarter of the bits in the subpacket 450, and then performs memory writes operations that set the value of the selected subpacket bits 605 to the anchor 550, the eleven triplets 545(0) through 545(10), and the anchor delta extension. Advantageously, by encoding the stencil values 409 in this manner, the memory required to store the compressed stencil data is one-fourth the memory required to store the corresponding uncompressed stencil data In sum, a raster operations (ROP) unit is configured to compress batches of stencil values 409 that span multiple contiguous values. In one embodiment, a group of 8×4 samples is divided into a 4×4 left batch and a 4×4 right batch. If the stencil values 409 associated with the left batch span at most 3 contiguous values (N, N+1, and N+2), then the left batch is a compressible with an anchor value of N. Similarly, if the stencil values 409 associated with the right batch span at most 3 contiguous values (M, M+1, and M−2), then the right batch is compressible with a right anchor value of M. The ROP unit determines an anchor delta by subtracting the anchor value from the right anchor value. If the anchor delta is within the range of (−3) to 2 and the batches are individually compressible, then the group of 8×4 samples is compressible. Finally, if each of the four groups included in a 16×8 block are compressible, then the ROP unit compresses the four groups. To compress a group, the ROP unit efficiently encodes the anchor value, the offsets of each of the stencil values 409 in the left group from the anchor, the anchor delta, and the offsets of each of the stencil values 409 in the right group from the right anchor as bits included in the subpacket. Further, the ROP unit performs memory operations to store the compressed stencil data for the four groups in the memory location that would otherwise store the data of a single uncompressed group.

Advantageously, since the stencil values within a compressed group may vary by more than one, the number of samples that are associated with compressed stencil values is increased compared to conventional one-bit delta compression techniques. By operating on compressed stencil values instead of uncompressed stencil values, the PPU reduces the number of memory and computational operations associated with the stencil values included in the stencil buffer. Consequently, implementing the disclosed techniques may enable the PPU to reduce memory bandwidth use, reduce power consumption, and increase rendering frame rate compared to PPUs that implement conventional one-bit delta compression techniques.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for compressing stencil values, the method comprising:
    selecting a first anchor for a first batch of stencil values that includes a first stencil value;
    selecting a second anchor for a second batch of stencil values that includes a second stencil value;
    computing a first offset that is included in a first plurality of offsets based on the first stencil value and the first anchor, wherein the first plurality is associated with the first batch;
    computing a second offset that is included in a second plurality of offsets based on the second stencil value and the second anchor, wherein the second plurality is associated with the second batch;
    computing an anchor delta based on the first anchor and the second anchor; and
    storing the first anchor, the anchor delta, the first plurality of offsets, and the second plurality of offsets in a memory as a first compressed stencil data instead of storing the first batch and the second batch in the memory as uncompressed stencil data.

2. The method of claim 1, further comprising performing a first stencil operation based on the first anchor, the anchor delta, and the second offset instead of performing the first stencil operation directly on the second stencil value.

3. The method of claim 1, further comprising encoding one or more offsets included in the first plurality of offsets into a memory-efficient representation prior to storing the first plurality of offsets.

4. The method of claim 1, further comprising encoding the first offset, the second offset, and a third offset as a first triplet prior to storing the first plurality of offsets and the second plurality of offsets.

5. The method of claim 1, further comprising encoding the anchor delta as an anchor delta base and an anchor delta extension prior to storing the first compressed stencil data.

6. The method of claim 5, further comprising encoding the anchor delta base and one or more offsets included in at least one of the first plurality of offsets and the second plurality of offsets into a memory-efficient representation prior to storing the first compressed stencil data.

7. The method of claim 5, further comprising encoding the first offset, the second offset, and the anchor delta base as a first triplet prior to storing the first compressed stencil data.

8. The method of claim 7, wherein storing the first compressed stencil data comprises performing one or more write operations associated with the first anchor, the first triplet, and the anchor delta extension.

9. The method of claim 1, wherein the amount of memory used to store the first compressed stencil data is less than the amount of memory required to store the uncompressed stencil data.

10. The method of claim 1, further comprising performing a single memory transaction to store the first compressed stencil data and at least a second compressed stencil data in the memory.

11. A computer-readable storage medium including instructions that, when executed by a processing unit, cause the processing unit to compress stencil values by performing the steps of:
    selecting a first anchor for a first batch of stencil values that includes a first stencil value;
    selecting a second anchor for a second batch of stencil values that includes a second stencil value;
    computing a first offset that is included in a first plurality of offsets based on the first stencil value and the first anchor, wherein the first plurality is associated with the first batch;
    computing a second offset that is included in a second plurality of offsets based on the second stencil value and the second anchor, wherein the second plurality is associated with the second batch;
    computing an anchor delta based on the first anchor and the second anchor; and
    storing the first anchor, the anchor delta, the first plurality of offsets, and the second plurality of offsets in a memory as a first compressed stencil data instead of storing the first batch and the second batch in the memory as uncompressed stencil data.

12. The computer-readable storage medium of claim 11, further comprising performing a first stencil operation based on the first anchor, the anchor delta, and the second offset instead of performing the first stencil operation directly on the second stencil value.

13. The computer-readable storage medium of claim 11, further comprising encoding one or more offsets included in the first plurality of offsets into a memory-efficient representation prior to storing the first plurality of offsets.

14. The computer-readable storage medium of claim 11, further comprising encoding the first offset, the second offset, and a third offset as a first triplet prior to storing the first plurality of offsets and the second plurality of offsets.

15. The computer-readable storage medium of claim 11, further comprising encoding the anchor delta as an anchor delta base and an anchor delta extension prior to storing the first compressed stencil data.

16. The computer-readable storage medium of claim 15, further comprising encoding the anchor delta base and one or more offsets included in at least one of the first plurality of offsets and the second plurality of offsets into a memory-efficient representation prior to storing the first compressed stencil data.

17. The computer-readable storage medium of claim 11, wherein the amount of memory used to store the first compressed stencil data is less than the amount of memory required to store the uncompressed stencil data.

18. The computer-readable storage medium of claim 11, further comprising performing a single memory transaction to store the first compressed stencil data and at least a second compressed stencil data in the memory.

19. A system configured to compress stencil values, the system comprising:
    a memory;
    a processing unit coupled to the memory and configured to:
        select a first anchor for a first batch of stencil values that includes a first stencil value;
        select a second anchor for a second batch of stencil values that includes a second stencil value;

compute a first offset that is included in a first plurality of offsets based on the first stencil value and the first anchor, wherein the first plurality is associated with the first batch;

compute a second offset that is included in a second plurality of offsets based on the second stencil value and the second anchor, wherein the second plurality is associated with the second batch;

compute an anchor delta based on the first anchor and the second anchor; and store the first anchor, the anchor delta, the first plurality of offsets, and the second plurality of offsets in the memory as a first compressed stencil data instead of storing the first batch and the second batch in the memory as uncompressed stencil data.

20. The system of claim 19, wherein the amount of memory used to store the first compressed stencil data is less than the amount of memory required to store the uncompressed stencil data.

* * * * *